Nov. 12, 1968     S. DE CARVALHO     3,410,839
IMMUNOCHROMATOGRAPHIC PARTITION OF SOLUBLE ANTIGENS
Filed April 16, 1964     2 Sheets-Sheet 2

INVENTOR
Sergio De Carvalho

BY *Lawrence I. Field*

ATTORNEY

United States Patent Office 3,410,839
Patented Nov. 12, 1968

3,410,839
IMMUNOCHROMATOGRAPHIC PARTITION OF SOLUBLE ANTIGENS
Sergio de Carvalho, Cleveland Heights, Ohio, assignor to Rand Development Corporation, Cleveland, Ohio, a corporation of Ohio
Filed Apr. 16, 1964, Ser. No. 360,198
8 Claims. (Cl. 260—112)

ABSTRACT OF THE DISCLOSURE

There is presented a process for separating normal antigens and abnormal antigens from a mixture thereof by preparing an insoluble polygamma globulin which is a reaction product of (1) a soluble anti-normal gamma globulin that contains antibodies to normal human proteins and (2) tetrazobenzidene to provide such insoluble polygama globulin; and passing the mixture of normal and abnormal antigens through a column of such polygamma globulin to remove the normal antigens by reaction with the polygamma globulin and thereby to separate the abnormal antigens from the mixture without affecting the antibody function thereof.

---

Figure 1:
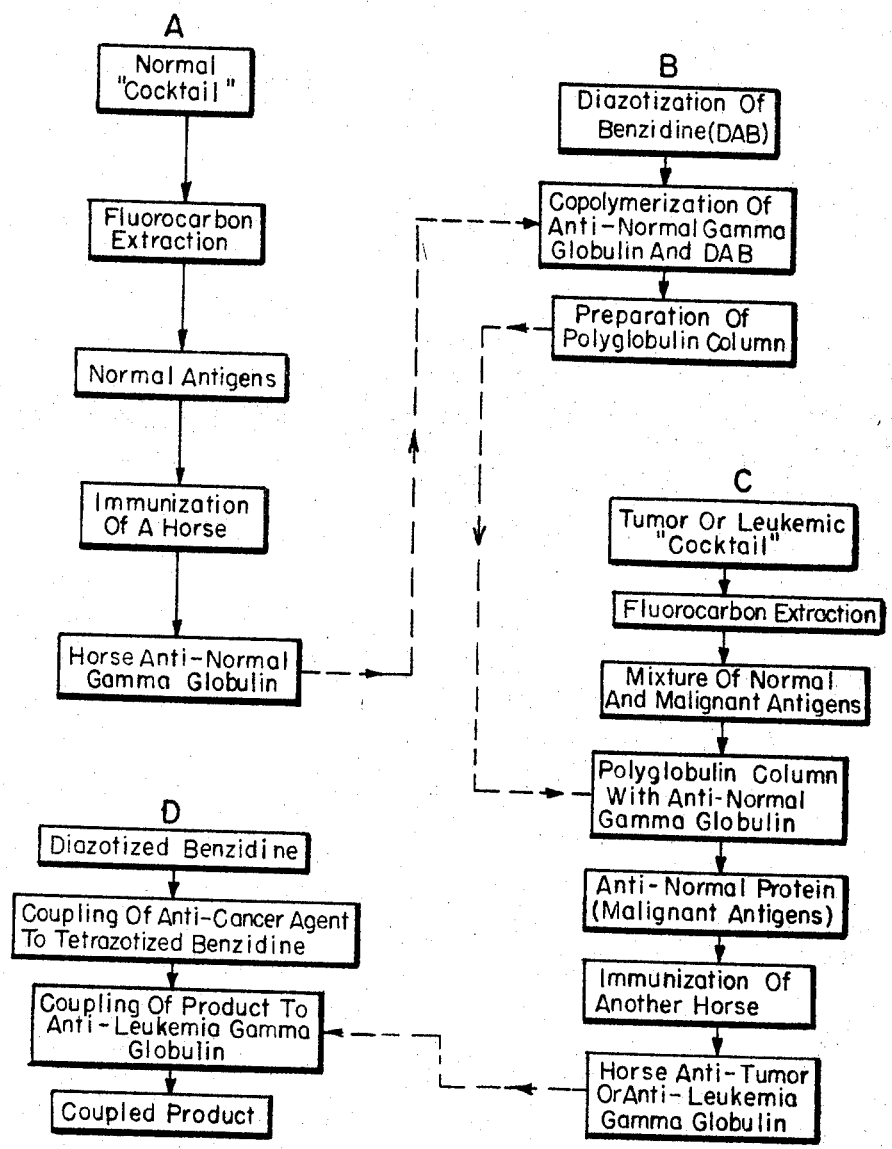

This invention relates to the production of insoluble immune gamma globulins wherein the antibody function is not affected by the insolubilization of the gamma globulin, to the uses of such insoluble antibodies in the production of specific antigens against cancer, virus, bacteria or other disease producing organisms, and to the coupling to chemotherapeutic agents to specific antibodies.

A specific object of the invention is to provide a practical and efficient process for the production of an injectable hyperimmune gamma globulin concentrate which may be used for the treatment of cancer, leukemia, and other diseases including those caused by virus or bacteria.

Because the production of an injectable hyperimmune anti-leukemia or anti-tiumor globulin concentrate is a particularly preferred embodiment of the invention, in the description which follows the production of such a concentrate is described in detail for purposes of illustration, but it is to be understood that the insolubilization of antibodies for the absorption of specific antigens has a much more universal applicability and hence the embodiment described is to be considered illustrative rather than limiting the invention.

It is presently understood that the cells of a normal or healthy human being exhibit a normal complement of proteins which is somewhat dependent on the specific kind of cells and the functions which they perform in the body. In contrast with this, the cells taken from a cancer include some of the normal complement of proteins usually present together with some abnormal proteins, which may be either newly acquired proteins not ordinarily present in the cell or which may be proteins ordinarily present in the normal complement of proteins but which have been altered in a manner which is not fully understood, but in either event these abnormal proteins give the cell a cancer nature. In the description which follows the terms cancer, leukemia and tumor may be used to indicate cells which are characterized by the presence of such an abnormality.

The classical method for producing antibodies to the abnormal proteins characteristic of cancer cells was to extract the protein from a cancer and to inject the resulting extract containing both normal and abnormal proteins into one or more animals such as a horse or other animal. When any foreign protein is introduced into an animal, the production of substances that are capable of combining with the foreign protein is stimulated. In this specification the term *antigen* is intended to identify such foreign proteins and the term *antibody* is intended to designate the substances released into the blood, which combine with such antigens.

Since the injected proteins were "foreign" to the new host, the host proceeded to produce antibodies against them, two kinds of antibodies being produced, a first kind against the normal proteins and a second kind against the abnormal proteins. After a suitable interval of time during which the host animal developed these antibodies, the animal was bled and the mixture of antibodies was then recovered from the blood as the gamma globulin portion of the blood, by centrifuging and other physical means. The separation of the two kinds of antibodies in this mixture from one another has proven to be extremely difficult and insofar as I am aware no practical method has yet been devised to effect this separation and the recovery of the desired antibodies against the abnormal proteins in sufficient amounts to permit their use in the treatment to tumors and leukemias with their potency unimpaired.

The present invention is directed primarily to a method of converting the soluble gamma globulin containing the antibodies to normal human protein to an insoluble compound without adversely affecting the antibody function and to the resulting product, as well as to the use of the product for the separation of the normal antigens from the mixture of normal antigens and malignant antigens previously available.

Although the insoluble antibody may be an antibody against virus, bacteria or other types of organisms, the invention has been found to be particularly useful in the production of insoluble immune gamma globulins and will be described with reference thereto, particularly with reference to the recovery of tumor specific antibodies, it being understood that this represents a preferred species of the invention which is of much more general utility.

Once the insoluble immune gamma globulin has been produced, it is utilized as the means for separating the normal proteins from the abnormal proteins in a mixture of the same, as will be hereinafter described.

Thereafter, the abnormal proteins may be injected into a second host animal for the production of antibodies against only the abnormal proteins, the resulting tumor specific antibodies (TSA) may then be recovered and utilized in the treatment of the cancer, and in the diagnosis of cancer.

In a paper entitled "Segregation of Antigens From Human Leukemic and Tumoral Cells by Fluorocarbon Extraction," which appeared in The Journal of Laboratory and Clinical Medicine, vol. 56, No. 3, pp. 333–341, September 1960, I have described a method for extracting the antigens from tissues.

In another paper the technique for growing antibodies has been described by me (Cancer, vol. 16, No. 3, March 1963, p. 306 et seq.).

The disclosures of both of these papers are incorporated herein by reference.

Each of the several steps will now be described in greater detail it being noted however that in some instances the individual step utilizes a known procedure in an otherwise unknown and novel combination of steps.

Figure 2:
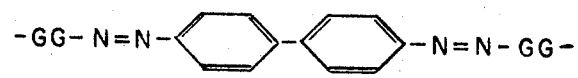
Figure 3:
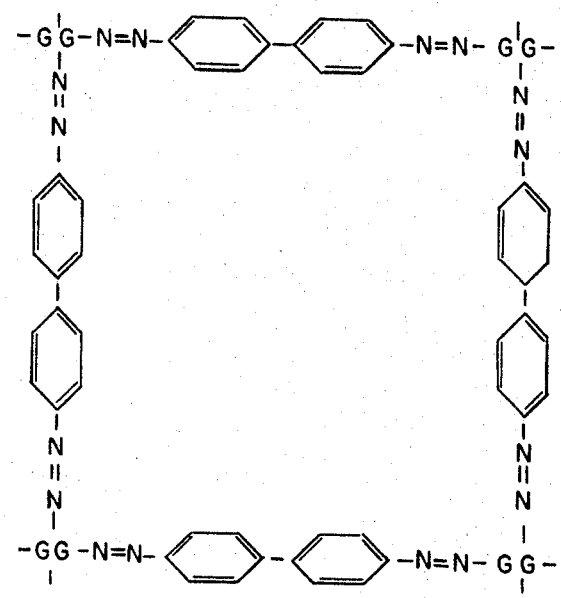

In the drawings:
FIGURE 1A is a schematic flow sheet for the preparation of gamma globulin;
FIGURE 1B is a schematic flow sheet for the preparation of a polyglobulin column;
FIGURE 1C is a schematic flow sheet for the utilization of the processes of FIGURES 1 and 2 to produce tumor specific antibodies; and
FIGURE 1D shows the use of the product of FIGURE 3 in the preparation of a related product of the invention;
FIGURE 2 represents one unit resulting from the reaction between the gamma globulin and the tetrazobenzidine; and FIGURE 3 is a schematic representation of the product which results from the subsequent coupling of the units of FIGURE 2 into the polymer of the polyglobulin column.

(1) GROWTH OF ANTIBODIES

In order to grow antibodies in a host animal it is first necessary to extract antigen from normal tissues (or solid tumor tissues or leukemic tissues).

The tissues utilized have heretofore been obtained at surgery or from autopsies performed within 4 hours post mortem.

The following is a list of normal and neoplastic tissues from which antigens have been collected by the method described below:

Normal

| | |
|---|---|
| Bone marrow | Spleen |
| Stomach | Skin |
| Brain | Omentum |
| Breast, functioning | Testis |
| Kidney | Subcutaneous fat |
| Ileum | Thymus |
| Colon | Thyroid |
| Liver | Placenta |
| Lung | Esophagus |
| Skeletal muscle | Uterus |
| Ovary, functioning | Whole blood |
| Pituitary | |

Malignant

I(a).—Carcinomas:

| | |
|---|---|
| Breast | Prostate |
| Colon | Pancreas |
| Bronchogenic | Rectum |
| Alveolar | Stomach |
| Ovary | Kidney |
| Sigmoid colon | Fallopian tube |
| Thyroid | Jejunum |
| Ileum | Skin |
| Cervix | |

I(b).—Sarcomas:
    Fibrosarcoma, leg
    Reticulo cell sarcoma, mediastinal
    Liposarcoma, thigh
    Melanosarcoma I(c).—Miscellaneous tumors:
    Astrocytoma IV, brain
    Thymoma II.—Leukemic tissues:
    Lymphosarcoma
    Lymphocytic lymphoma
    Spleen of acute lymphatic leukemia
    Spleen of acute stem cell leukemia The tissues are frozen after removal of grossly necrotic parts, fat, clots, connective tissue and blotting of imbibing fluids.

Three antigenic preparations are made: One of normal tissues, one of solid tumor tissues and one of leukemic tissues. Lymphoma tissues listed above have been included in the leukemic tissues. Fixed amounts of ground frozen tissues are weighed and mixed to provide separate mixtures of normal, tumor or leukemic tissues. Each one of these mixtures is then processed separately. The method is substantially that described in the Journal of Laboratory and Clinical Medicine (Vol. 56, No. 3, p. 334, September 1960) and is as follows:

The frozen ground tissue is mixed with 1–5 to 1–10 weight/volume with GBS at pH 10.4–4° C. GBS is an isotonic glycine buffer of the following composition:

7.505 gm. glycine
5.830 gm. sodium chloride
1.840 gm. sodium hydroxide in 1000 ml. of triple distilled water To this mixture an equal volume of chilled Genetron is added. Genetron is the fluid fluorocarbon trifluoro-trichloro-ethane. This substance, which is obtained from Allied Chemical Corporation, 40 Rector St., New York, N.Y., is redistilled in glass containers at 47° C. before use. This two-phase system is placed in a VirTis flask, surrounded by a bath of ice and acetone and homogenized with the Rand 85 homogenizer. This instrument consists of an air rotor driven by 100 pounds of compressed air and a shaft carrying sharp stainless steel blades. During homogenization periods of 7–10 minutes the temperature inside the mixture is 2–4° C. at speeds reading from 80 to 85,000 revolutions per minute. The homogenate is then centrifuged at 1400 g. for 10 mintues at 2° C. This separates the mixture into an aqueous turbid supernatant and a gelatinous sediment. The sediment is saved, chilled or frozen and the supernatant is added fluorocarbon and homogenized in the same way as the original material. After 8–15 operations, no sediment is formed. At this point the supernatant contains no detectable protein and is clear and very rich in ribonucleic acid as determined by ultra violet absorption, biuret and orcinol methods. All sediments are then combined in the following way: They are first stirred with a glass rod and a certain amount of fluorocarbon expressed out and decanted. Then a fixed amount of chilled GBS pH 10.4 is added to the combined sediments and these thoroughly resuspended, usually 2–1 volume/weight. This mixture is centrifuged at 1400 g. for 10 minutes at 2° C. The supernatant is saved, the sediment is stirred with a glass rod, fluorocarbon is decanted from the broken sediment and the supernatant added again to resuspend the sediment. Centrifugation and the same cycle of operations are carried on until no fluorocarbon is obtained from the sediment which went into solution for the larger part. In this way 80 to 95% of the original protein material is recovered in solution. This solution is clarified by centrifugation at 20,000 g. and dialysed against isomolar PBS at 2° C. in 24 A. average pore size cellophane bags with agitation for 24 hours. Protein concentration is determined as $$E^{1\ cm.}_{280\ m\mu}$$

versus a standard dilution of a tyrosine-rich albumin solution. Processing of an average amount of frozen tissue, i.e. 500 gm., may take 6–8 days. During rest periods the solutions are frozen; if a delay is imposed by unwanted reasons, then antibiotics and/or preservatives are added to discourage bacterial and fungi and yeast growth. 100 units of potassium penicillin, 100 micrograms of streptomycin sulphate and 100 micrograms of mycostatin are added to a 1000 ml. batch. As a preservative, thimerosal (Merthiolate, Lilly) has been added to a final dilution of 1:10,000. These materials will eventually be removed in the dialysis. The final solution with a pH of 7.2 (electrometrically determined, Beckman) is filter-sterilized through thoroughly washed asbestos pads (Seitz). Cultures on thioglycollate fluid medium for 7 days are run to establish absence of bacteria along the lines of sterility tests.

The protein yield of the frozen ground tissue is in average 4–5% of the original wet weight for the normal, 2–3% for the solid tumors and 3.5–4.5% for the leukemic tissues. This final antigen preparation contains an average of 2–3 gm./100 ml. of protein. Further concentration may be accomplished by dehydration by counter-dialysis against Carbowax 20M polyethylene glycol (20,000 M.W.) or, preferably, in a freeze-dryer such as VirTis since low polymers of the glycol penetrate the solution and interfere with its 280 m$\mu$ absorbancy.

The protein solution from a mixture of normal tissues is used to immunize horses. The immunizing dose given to a horse of any of the three antigens, normal, tumor or leukemia, is 35 mg. of protein per ml. of solution per 10 pounds of body weight per 2 weeks, intramuscularly at sites more than 6 inches away from the bleeding sites. The second dose is incorporated in 5:1 by volume of complete Freunds's adjuvant (Difco Laboratories). When tests indicate that suitable levels of precipitating antibody titers for harvesting of plasma have been reached, collections of blood are made every 2 weeks no less than 5 days from the last injection. The blood is drawn by low negative pressure from a 13 gauge needle inserted in the jugular vein and attached to a vinyl tube; it is collected in a polyethylene carboy containing 3.8% sodium citrate with 9 parts of blood per 1 part of anticoagulant. Periodic gentle stirring ensures thorough mixture of the anticoagulant. Each bleeding consists of 6 to 8 liters of blood. The blood is left to sediment by gravity at 2° C. overnight. The plasma is aspirated, centrifuged at 1600 g. for 10 minutes, to separate the gamma globulin which is then measured and frozen in polyethylene containers, and stored until it is to be used.

THE PRESENT INVENTION.—PRODUCTION OF POLYGLOBULIN

The present invention resides in the insolubilization of the immune gamma globulins separated from the blood collected from the horses innoculated with normal human antigens without affecting the antibody function.

Briefly this portion of the process comprises reacting bifunctional tetrazobenzidine groups with the gamma globulin whereby the latter is converted to an insoluble form, possibly as the result of crosslinking. The resulting polyglobulin functions as an insoluble adsorbent for specific antigens.

The procedure to make the polyglobulin column is as follows:

(A) Diazotization of benzidine

The diazotization of benzidine is accomplished in a manner which is well known and which does not constitute the present invention. A preferred method of accomplishing this is as follows:

Seven hundred twenty mg. of benzidine was dissolved in six and one-half mg. of 6 N HCl. To this solution 31.5 ml. of distilled water was added and then the resulting solution was cooled to between 7° C. and 8° C. Below 6° C. this composition freezes.

Thirty-seven ml. of the freshly prepared chilled solution was placed in a 100 ml. beaker and chilled by means of a mixture of ice water and common salt. While the benzidine was maintained at about 7–8° C., fourteen ml. of a precooled sodium nitrite solution—prepared by dissolving 1.3 g. of $NaNO_2$ and 33 ml. of distilled water and chilling the resulting solution to about 8° C.—was added to the chilled benzidine solution in increments of about 0.2 ml., over a two minute interval. A light yellow straw color is produced as a result of the addition which persists throughout the addition.

Immediately after each addition of 0.1–0.2 ml., a piece of starch iodide paper immersed in the solution becomes dark blue. This indicates excess of nitrite just added. After stirring for 10 seconds, the nitrite is partly combined, partly eliminated and the iodide paper no longer becomes blue. The end point is indicated by persistence of bluing of the paper even after 10–20 seconds of stirring. However, prolonged stirring (10 minutes) will again eliminate bluing of the paper as a result of volatilization of excess nitrous acid. As a result of the foregoing the benzidine is completely diazotized according to the following reaction:

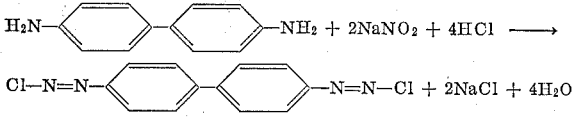

The color of the tetrazo-benzidine may be brought forth by addition of sodium acetate. The sodium acetate is prepared as a solution by dissolving 4.50 g. of sodium acetate in 20.0 ml. of water and chilling the resulting solution to about 8° C. In a 250 ml. beaker place 20.0 ml. of freshly prepared sodium acetate solution. With constant stirring the tetrazo-benzidine solution is added to the sodium acetate solution over a one minute interval. The color becomes first light yellowish-green and in 3 to 5 minutes changes to yellowish-brown (weak tea color).

(B) Copolymerization of immune gamma globulin

In a 1000 ml. beaker place 600 ml. of a solution of 1.6% gamma globulin in 1/15 M Sørensen phosphate buffered saline, pH 7.2 (PBS 7.2). This solution is kept to 8° C. during the operations. In a period of 30 minutes add 720.0 mg. of freshly prepared tetrazobenzidine prepared as described above, with slow stirring to avoid foaming. Wait 7 minutes and then add 10 ml. of 8 N potassium carbonate. Continue to stir for another 10 minutes. Stirring during coupling prevents massive gelation of the globulin. The final product has the consistency of a gel. The mixture is then filtered in a Buchner and washed with phosphate buffered saline (PBS 7.2).

(C) Preparation of polyglobulin column

The slurry obtained as a result of resuspending the polymerisate described above is resuspended in 60 ml. of phosphate buffered saline (PBS 7.2). The column is packed by gravity; the flow rate of the absorbate in this column is about 120 drops per minute. Absorptions are performed in a cold room or by surrounding the column and absorbates with cooling devices.

Using a slurry consisting of 50 ml. of phosphate buffered saline (PBS 7.2) and 9.6 grams of polyglobulin prepared from equine anti-normal human gamma globulin and freshly prepared tetrazobenzidine a 30 x 1.25 cm. glass column was packed by gravity and then a solution of proteins from a pool of leukemic spleens was passed into the column and reacted with the immune gamma globulin. After three runs through the globulin column, the eluate did not react with the same globulin nor with rabbit anti-horse gamma globulin but reacted to $2^{-6}$ with a horse immune gamma globulin from animals immunized with the chromatographed antigens. These results indicate: (1) No soluble gamma globulin existed in the column. (2) Absorption of normal antigens in leukemic spleens took place to completion. (3) Specific leukemic antigens were isolated in pure form. This technique provides a highly sensitive and specific method to both analyze and prepare large amounts of different antigens from a mixture when some of these antigens are available to prepare specific gamma globulins as immunologic absorbents.

In another run using a similarly prepared column 50 ml. containing 4.3 grams of leukemia cocktail protein in 0.1 M. glycine buffered saline (pH 10.4) were added. Absorbate 1 was sampled and rerun two more times giving absorbates 2 and 3. After this 50 ml. aliquots of PBS 7.2 were added and washings 1 to 16 were obtained.

The several fractions were tested by the precipitin methods described in Nature 194, p. 1275 (1962) and in Exp. Mol. Path., vol. 3, suppl. 2, 220 (1964), with the results shown in Table I, below.

TABLE I.—PRECIPITIN TITERS IN A TWO-DIMENSIONAL TITRATION SYSTEM

| Fraction | Reaction against | | |
|---|---|---|---|
| | Equine anti-human normal gamma globulin | Equine anti-leukemia gamma globulin | Rabbit anti-horse gamma globulin |
| Normal cocktail | $2^{-7}$ | $2^{-2}$ | 0 |
| Leukemia cocktail | $2^{-3}$ | $2^{-5}$ | 0 |
| Absorbate 1 | $2^{-1}$ | $2^{-4}$ | 0 |
| Absorbate 2 | 0 | $2^{-5}$ | 0 |
| Absorbate 3 | 0 | $2^{-6}$ | 0 |
| 1st washing | 0 | $2^{-6}$ | 0 |
| 6th washing | $2^{-2}$ | 0 | 0 |
| 16th washing | 0 | 0 | 0 |

Using a similar column and a tumor protein cocktail instead of the leukemia protein cocktail, the results shown in Table II were obtained.

TABLE II.—PRECIPITIN TITERS IN A TWO-DIMENSIONAL TITRATION SYSTEM

| Fraction | Reaction Against | |
|---|---|---|
| | Equine anti-normal human gamma globulin | Equine anti-tumor gamma globulin |
| Normal protein cocktail | $2^{-7}$ | $2^{-2}$ |
| Tumor protein cocktail | $2^{-3}$ | $2^{-4}$ |
| Absorbate 1 | $2^{-1}$ | $2^{-3}$ |
| Absorbate 2 | 0 | $2^{-4}$ |
| Absorbate 3 | 0 | $2^{-5}$ |
| 1st washing | 0 | $2^{-5}$ |
| 6th washing | $2^{-3}$ | 0 |
| 16th washing | 0 | 0 |

The technique is effective with other than tumor or leukemic proteins, as is evident from the following example:

A column of 1 x 0.5 cm. was made with 13 mg. of polytetanus antitoxin prepared by reaction of tetrazobenzidine with equine tetanus antitoxin (Lilly, Lot #080-823880) as a globulin concentrate containing 3000 neutralizing units and 0.22 mg. of protein per ml. which corresponds to a precipitin titer of $2^{-9}$ against a tetanus toxoid (Lilly) containing 15 $L_f$ units of tetanus toxoid per ml. From the conversion of volumes to precipitin titers, an amount of toxoid not in excess of the total precipitating capacity of all the tetanus antitoxin in the column was estimated. Accordingly, 0.3 ml. of toxoid was diluted in 0.6 ml. of a rabbit serum containing 4.6 grams of protein per 100 ml. and the mixture brought to 10 ml. volume with phosphate buffered saline (PBS 7.2). The mixed antigen dilution was then run twice through the column and samples of the absorbates tested in precipitin systems. Table III gives the results.

TABLE III.—PRECIPITIN TITERS IN A TWO-DIMENSIONAL PRECIPITATION SYSTEM

| Fraction | Reaction Against | | |
|---|---|---|---|
| | Sheep anti-rabbit gamma globulin [1] | TAT | Rabbit anti-horse gamma globulin |
| Mixture of tetanus toxoid and rabbit serum | $2^{-3}$ | $2^{-9}$ | 0 |
| Absorbate 1 | $2^{-3}$ | $2^{-7}$ | 0 |
| Absorbate 2 | $2^{-3}$ | 0 | 0 |
| 1st washing | $2^{-3}$ | 0 | 0 |
| 3rd washing with PBS pH 7.2 | 2 | $2^{-3}$ | 0 |
| 16th washing | 0 | 0 | 0 |

[1] Colorado Serum Co. CS1466, a sheep immune globulin with a precipitin titer of $2^{-3}$ against pooled rabbit gamma globulin.

The results of the tests tabulated in Tables I, II and III indicate that:

(1) The polymerized equine gamma globulin is totally insoluble since no traces were detected in absorbates or washings by reaction with a high-titered rabbit anti-horse globulin.

(2) The polyglobulin possesses full and specific antibody activity since it retains all normal antigens from the tumor protein cocktail after two absorptions without retaining all of the anti-tumor activity as tested by reaction of the absorbates against an equiine immune gamma globulin possessing both anti-normal and anti-tumor activity.

(3) There is no non-specific adsorption of non-specific antigens as shown by the fact that leukemia or tumor antigens react to higher titers after absorption through the column than before absorption, i.e. in their mixture with normal antigens. The absorption which seems to occur in the column has the characteristics of an immune reaction.

(4) An excess of antigen prevented absorption in the column. Thus, when three times the amount of antigen in the zone of equivalence predicted was added to the column, no absorption of antigens was detected. Instead, quantitatively, milligram per milligram, they were all recovered in the absorbates and washings.

PRODUCTION OF GLOBULIN COMPOUNDS

Another aspect of the invention relates to the preparation of novel products based on coupling the anti-leukemia or anti-tumor gamma globulin prepared by the process schematically shown in FIGURE 1C with various chemotherapeutic compounds.

This portion of the invention may be regarded as comprising the three steps illustrated in FIGURE 4, namely:

diazotization of the benzidine; coupling of chemotherapeutic agent to the benzidine; and coupling of the last named compound of anti-leukemia gamma globulin.

The following products are illustrative of this aspect of the invention:

(I) Anti-leukemia gamma globulin coupled with methotrexate.

(II) Anti-tumor gamma globulin coupled with methotrexate.

(III) Anti-tumor gamma globulin coupled with uracil mustard.

Product I has the following composition: Equine hyperimmune anti-leukemia gamma globulin 65–90 gm./100 ml.-methotrexate 140–180 mg./100 ml.-isotonic saline-merthiolate 1:10,000.

Product II has the following compositions: Equine hyperimmune anti-tumor gamma globulin 65–90 gm./100 ml.-methotrexate 140–180 mg./100 ml.-isotonic saline-merthiolate 1:10,000.

Product III has the following composition: Equine hyperimmune anti-tumor gamma globulin 68–162 gm./100 ml.-uracil mustard 180–273 mg./100 ml.-isotonic saline-merthiolate 1:10,000.

In this procedure, the chilled benzidine is diazotized by means of precooled sodium nitrite as described above.

Solutions of uracil mustard (Upjohn) and solution of methotrexate (4-amino-$N^{10}$-methyl pteroyl glumatic acid) are prepared by dissolving 500 mg. of each compound in 12.0 ml. of 1 N NaOH and then adding 16.0 ml. of water. The resulting solution was chilled to about 8° C. To the freshly prepared tetrazo-benzidine, 28.0 ml. of one or the other freshly prepared solutions was added over a period of 2 minutes. The resulting mixture slowly acquired a deep brownish-red color indicative of coupling of the chromogen. The mixture was permitted to stand for 7 minutes at 8° C. To complete coupling, 10.0 ml. of 8 N potassium carbonate was added dropwise with vigorous stirring with methotrexate, the color of the resulting compound (diazodiphenyl-diazo-methotrexate or simply azotrexate) was deep coffee color and clear. With the uracil mustard, the color of the resulting compound (tetrazobenzidine-uracil mustard) was red-orange or brick and turbid due to gas formation. The end point when adding methotrexate is the point of maximum color development without precipitation. The end point when adding uracil mustard is a clear cut point. With each addition the solution becomes darker; at the end point it suddenly clears (from dark cola to red brick). The solutions are permitted to remain undisturbed at 8° C. for 45 minutes to 1 hour in the dark.

The gamma globulin reagent produced by the procedure of FIGURE 1C is placed in a 250 ml. beaker and the azotized drug is added in 10.0 ml. aliquots at 1 minute intervals. This end point is very sharp. Moreover, excess of the tetrazo compound will cause instant irreversible gelation. For this reason back-titration before each new addition should be carried out on 2 side test tubes, one containing 1 ml. of the mixture and 0.1 ml. of the tetrazo compound and one containing 1 ml. of this compound and 0.1 ml. of the mixture which will provide the conditions of excess of each reagent. The stirring at this step must be very gentle to avoid formation of foam which denatures the protein. After reaching the end point 10.0 ml. of 8 N potassium carbonate are added dropwise with gentle stirring.

The colors of the coupled gamma globulins are essentially the same as those of the tetrazo compounds. Spectrophotometric measurements of the tetrazo compounds and of the coupled gamma globulin are possible due to specific monochromatic absorptions. Quantitative determination of each element in the final compound is possible when standard solutions of each separate element and of their physical admixtures are made.

The following are the wavelengths showing peaks of absorbancy for the different elements (FIGS. 2–a, b and c).

Tetrazo-biphenyl-methotrexate (azotrexate):
  $\lambda_{max.}=365, 305, 252$ m$\mu$
  $\lambda_{min.}=240, 267, 237$ m$\mu$ Tetrazo-biphenyl-uracil mustard (azoum):
  $\lambda_{max.}=400$ m$\mu$
  $\lambda_{min.}=310$ m$\mu$ Gamma globulin:
  $\gamma_{max.}=280$ m$\mu$
  $\gamma_{min.}=250$ m$\mu$ The final product is next dialyzed against isotonic sodium chloride. The substance is placed in cellophane bags and these in 1/100 v./v. of saline with stirring for 18 hours. The extent of the dialysis required to eliminate uncoupled materials is determined by studying the absorption of samples of the saline on the spectrophotometer. Dialysis is stopped when there is only non-chromatic saline in the expected wavelength ranges. After dialysis, the volume is adjusted to near the original concentration of the gamma globulin by freeze-evaporation.

Having now described the invention and several of its preferred embodiments it is not intended that it be limited except as may be required by the appended claims.

I claim:

1. A process for separating normal antigens and abnormal antigens from a mixture thereof, the process comprising the steps of:
   (a) preparing a soluble anti-normal gamma globulin by injecting an undenatured normal protein into an animal and separating the anti-normal gamma globulin from the blood of said animal, the undenatured normal protein being obtained by repeatedly homogenizing normal tissue in a fluorocarbon diluent to separate the tissue nucleoprotein into nucleic acid and undenatured normal protein;
   (b) reacting the soluble anti-normal gamma globulin with tetrazobenzidine to provide an insoluble polygamma globulin,
   (c) passing the mixture of normal and abnormal antigens through a column of said polygamma globulin to remove the normal antigens by reaction with the polygamma globulin and thereby separate the abnormal antigens from the normal antigens of said mixture.

2. A process for separating normal antigens and abnormal antigens from a mixture thereof, the mixture having been obtained by injecting a protein component into an animal and recovering the mixture of antigens from the blood of said animal, the protein component being obtained from homogenizing leukemic and tumoral cells in a fluorocarbon diluent to separate the cell nucleoproteins into a nucleic acid component and said protein component that is undenatured, the process comprising the steps of:
   (a) preparing an insoluble polygamma globulin that is a reaction product of (1) a soluble anti-normal gamma globulin that contains antibodies to normal human proteins and (2) tetrazobenzidene to provide the insoluble polygamma globulin; and
   (b) passing the mixture of normal and abnormal antigens through a column of said polygamma globulin to remove the normal antigens by reaction with the polygamma globulin and thereby to separate the abnormal antigens from said mixture.

3. A process for separating normal antigens and abnormal antigens from a mixture thereof, the mixture being obtained from the blood of an animal injected with an undenatured protein, the undenatured protein being obtained by homogenizing tumor tissue in a fluorocarbon diluent at a temperature of 2 to 4° C. at a speed of about 80,000 to 85,000 r.p.m. to provide a nucleic acid component and a protein component of the tissue nucleoproteins, and repeating the homogenization about 8 to 15 times to provide the undenatured protein, the process comprising the steps of:
   (a) preparing a soluble anti-normal gamma globulin by injecting an undenatured normal protein into an animal and separating the anti-normal gamma globulin from the blood of said animal, the undenatured normal protein being obtained by homogenizing normal tissue in fluorocarbon diluent at a temperature of about 2° to 4° C. at a speed of about 80,000 to 85,000 r.p.m. to provide a nucleic acid component and a protein component, and thereafter repeating the homogenization about 8 to 15 times to provide the undenatured normal protein,
   (b) reacting the soluble anti-normal gamma globulin with tetrazobenzidene to provide an insoluble polygamma globulin, and
   (c) passing the mixture of normal and abnormal antigens through a column of said insoluble polygamma globulin to react the normal antigens therewith and thereby separate the abnormal antigens from said mixture.

4. A process as defined in claim 1 in which the mixture of normal and abnormal antigens is obtained from the blood of a horse injected with a protein component of leukemic tissue nucleoproteins that have been repeatedly homogenized in a fluorocarbon diluent to provide the undenatured protein component.

5. A process as defined in claim 1 in which the mixture of normal and abnormal antigens is obtained from the blood of a horse injected with a protein component of tumor tissue nucleoproteins that have been repeatedly homogenized in a fluorocarbon diluent to provide the undenatured protein component.

6. A process as defined in claim 4 in which the leukemic tissues are pooled tissues.

7. A process as defined in claim 5 in which the tumor tissues are pooled tissues.

8. A process for separating normal antigens and abnormal antigens from a mixture thereof, the mixture being obtained from the blood of an animal injected with an undenatured protein, the undenatured protein being obtained by homogenizing leukemic tissue in a fluorocarbon diluent at a temperature of 2 to 4° C. at speed of about 80,000 to 85,000 r.p.m. to provide a nucleic acid component and a protein component of the tissue nucleoprotein and repeating the homogenization about 8 to 15 times to provide the undenatured protein, the process comprising the steps of:
   (a) preparing a soluble anti-normal gamma globulin by injecting an undenatured normal protein into an animal and separating the anti-normal gamma globulin from the blood of said animal, the undenatured normal protein being obtained by homogenizing normal tissue in a fluorocarbon diluent at a temperature of about 2° to 4° C. at a speed of about 80,000 to 85,000 r.p.m. to provide a nucleic acid component and a protein component, and thereafter repeating the homogenization about 8 to 15 times to provide the undenatured normal protein, (b) reacting the soluble anti-normal gamma globulin with tetrazobenzidene to provide an insoluble polygamma globulin, and (c) passing the mixture of normal and abnormal antigens through a column of said insoluble polygamma globulin to react the normal antigens therewith and thereby separate the abnormal antigens from said mixture.

References Cited
UNITED STATES PATENTS

| | | | |
|---|---|---|---|
| 2,957,808 | 10/1960 | Campbell | 167—78 |
| 3,384,434 | 11/1966 | Sutherland | 260—112 |

OTHER REFERENCES

The Specificity Serological Reactions, 1945, Landsteiner, pp. 100–105 and 108 Science (reprint) p. 455–457, vol. 73, April 1931, Bronfen Brenner et al. (reprint pp. 1–2).

Journal of Immunology, vol. 74, 1955, pp. 306–309, Stavitshy et al., Science, vol. 132, October 1960, pp. 1252–1253, Sutherland Academie des Science Comptes Rendus, 246, March 1958, Mathe et al., pp. 1626–1628.

Journal of Immunology, 86, 1961, Ishizaka et al., pp. 220–227.

WILLIAM H. SHORT, *Primary Examiner.*

H. SCHAIN, *Assistant Examiner.*